(12) United States Patent
Matsumoto et al.

(10) Patent No.: US 11,953,924 B2
(45) Date of Patent: Apr. 9, 2024

(54) FLUID CONTROL DEVICE, FLUID CONTROL SYSTEM, STORAGE MEDIUM STORING A PROGRAM FOR FLUID CONTROL DEVICE, AND FLUID CONTROL METHOD

(71) Applicant: HORIBA STEC, Co., Ltd., Kyoto (JP)

(72) Inventors: Sota Matsumoto, Kyoto (JP); Kentaro Nagai, Kyoto (JP); Yosuke Hisamori, Kyoto (JP); Kazuhiro Matsuura, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 21 days.

(21) Appl. No.: 17/847,822

(22) Filed: Jun. 23, 2022

(65) Prior Publication Data

US 2022/0413521 A1 Dec. 29, 2022

(30) Foreign Application Priority Data

Jun. 25, 2021 (JP) .................................. 2021-105441
Dec. 23, 2021 (JP) .................................. 2021-209344

(51) Int. Cl.
*G05D 7/06* (2006.01)
*F17D 3/01* (2006.01)
*G01F 1/36* (2006.01)
*G01F 15/00* (2006.01)

(52) U.S. Cl.
CPC ........... *G05D 7/0623* (2013.01); *G01F 1/363* (2013.01); *G05D 7/0635* (2013.01); *F17D 3/01* (2013.01); *G01F 15/005* (2013.01)

(58) Field of Classification Search
CPC ...... G05D 7/0623; G05D 7/0635; G01F 1/36; G01F 1/363; G01F 15/005; Y10T 137/7761; F17D 3/01
USPC ............... 137/487.5; 73/1.16–1.36, 861–281
See application file for complete search history.

(56) References Cited

U.S. PATENT DOCUMENTS 2,266,566 A * 12/1941 Poole ...................... G01B 13/02
73/1.25
2,561,700 A * 7/1951 Hughes ................. G01L 13/025
73/861.47
2,771,771 A * 11/1956 Johannes ................ G01F 1/586
118/712

(Continued)

FOREIGN PATENT DOCUMENTS

JP 2018018351 A 2/2018

*Primary Examiner* — William M McCalister
(74) *Attorney, Agent, or Firm* — Alleman Hall & Tuttle LLP

(57) ABSTRACT

In order to prevent unnatural behavior of a calculated flow rate, provided is a fluid control device in which a fluid control valve and upstream and downstream pressure sensors are provided on a flow path. The device includes a calculation unit configured to calculate a flow rate based on measured pressures; and an output unit configured to output the calculated flow rate, and exhibit a zero output function of outputting a zero value regardless of the calculated flow rate when the valve is in a closed state. The device is further configured to switch between execution and stop of the zero output function, and when the valve is in an open state and a difference between the measured pressures of the pressure sensors is larger than a threshold, stop the zero output function and cause the flow rate output unit to output the calculated flow rate.

6 Claims, 10 Drawing Sheets

(56) References Cited

U.S. PATENT DOCUMENTS

| | | | | |
|---|---|---|---|---|
| 2,822,689 | A * | 2/1958 | Bonapace | G01F 1/377 340/870.43 |
| 3,188,862 | A * | 6/1965 | Roth | G01F 1/665 73/861.26 |
| 3,792,611 | A * | 2/1974 | Kozak | G01F 1/103 73/861.33 |
| 3,898,883 | A * | 8/1975 | Kozak | G01F 1/10 73/861.92 |
| 4,193,301 | A * | 3/1980 | Ferrentino | G01F 1/363 73/861.53 |
| 4,672,331 | A * | 6/1987 | Cushing | G01F 1/60 341/157 |
| 5,297,427 | A * | 3/1994 | Shambayati | G01F 1/6842 73/203 |
| 6,725,731 | B2 * | 4/2004 | Wiklund | F15B 15/2838 73/861.58 |
| 6,832,628 | B2 * | 12/2004 | Thordarson | G05D 7/005 137/488 |
| 10,838,435 | B2 * | 11/2020 | Hirata | G05D 7/0635 |
| 2004/0123656 | A1 * | 7/2004 | Castleberry | G01D 5/2448 73/197 |
| 2004/0244837 | A1 * | 12/2004 | Nawata | G05D 7/0635 137/487.5 |
| 2006/0278276 | A1 * | 12/2006 | Tanaka | G01F 25/17 137/487.5 |
| 2010/0139775 | A1 * | 6/2010 | Ohmi | G01F 1/6847 137/12 |
| 2011/0108126 | A1 * | 5/2011 | Monkowski | F16K 7/14 137/12 |
| 2011/0120566 | A1 * | 5/2011 | Ohmi | G01F 1/42 137/12 |
| 2013/0001453 | A1 * | 1/2013 | Hirose | F16K 31/1226 251/285 |
| 2014/0069527 | A1 * | 3/2014 | Mudd | G05D 7/0635 137/487 |
| 2014/0283582 | A1 * | 9/2014 | Mills | G01M 3/002 374/54 |
| 2016/0274595 | A1 * | 9/2016 | Ohmi | G05D 7/0641 |
| 2016/0327963 | A1 * | 11/2016 | Hirata | F16K 31/02 |
| 2016/0349763 | A1 * | 12/2016 | Hirose | F16K 7/14 |
| 2017/0212531 | A1 * | 7/2017 | Nagase | G05D 7/0635 |
| 2019/0094847 | A1 * | 3/2019 | Nagase | G05D 7/0635 |
| 2019/0129452 | A1 * | 5/2019 | Hirata | G05D 7/06 |
| 2019/0250648 | A1 * | 8/2019 | Hirata | G05D 7/06 |
| 2020/0033895 | A1 * | 1/2020 | Sugita | G01F 1/363 |

* cited by examiner

FLUID CONTROL DEVICE, FLUID CONTROL SYSTEM, STORAGE MEDIUM STORING A PROGRAM FOR FLUID CONTROL DEVICE, AND FLUID CONTROL METHOD

BACKGROUND

Technical Field

The present invention relates to a fluid control device and the like.

Related Art

As a conventional fluid control device, as disclosed in JP 2018-18351 A, there is a so-called differential pressure-type mass flow controller configured to output a zero value regardless of a calculated flow rate calculated based on a differential pressure when a fluid control valve is in a closed state.

In such a configuration, it is conceivable that the output is returned from the zero value to the calculated flow rate at a timing when the fluid control valve is switched from a closed state to an open state.

However, when the output is simply switched from the zero value to the calculated flow rate at this timing, as illustrated in FIG. 7, the output may behave unnaturally, for example, the flow rate becomes negative immediately after the switching.

As a factor that causes the output to behave unnaturally, for example, there is a case where a large flow rate flows through a flow path coupled to a downstream side of a mass flow controller, and a part of the fluid flows back to the mass flow controller.

In addition, even when the fluid control valve is in the closed state, since a pressure change occurs in a subsequent stage due to a seat leak of the fluid control valve or the like, one of the factors may be that the calculated flow rate in the closed state varies from the zero value depending on a set flow rate immediately before the closed state, a pressure condition, a standby time in the closed state, or the like (see FIG. 7).

PRIOR ART DOCUMENT

Patent Document

Patent Document 1 JP 2018-18351 A

SUMMARY

Therefore, the present invention has been made to solve the above problems, and a main object thereof is to suppress an unnatural behavior of a calculated flow rate output from a fluid control device.

A fluid control device according to the present invention is provided with a fluid control valve, an upstream pressure sensor, and a downstream pressure sensor on a flow path, and includes an actual flow rate calculation unit configured to calculate a flow rate based on measured pressures of the upstream pressure sensor and the downstream pressure sensor, and a flow rate output unit configured to output a calculated flow rate calculated by the actual flow rate calculation unit, in which the flow rate output unit is configured to exhibit a zero output function that is a function of outputting a zero value regardless of the calculated flow rate when it is determined that the fluid control valve is in a closed state.

In the above-described configuration, the fluid control device further includes a switching unit configured to switch between execution and stop of the zero output function by the flow rate output unit in which the switching unit stops the zero output function and causes the flow rate output unit to output the calculated flow rate when the fluid control valve is in an open state and a difference obtained by subtracting the measured pressure of the downstream pressure sensor from the measured pressure of the upstream pressure sensor is larger than a predetermined stop threshold.

According to such a fluid control device, since a stop condition of the zero output function includes not only the fact that the fluid control valve is in the open state but also the fact that the difference obtained by subtracting the measured pressure of the downstream pressure sensor from the measured pressure of the upstream pressure sensor is larger than the predetermined stop threshold, it is possible to prevent a negative value from being output immediately after the zero output function is stopped and the output is switched from the zero value to the calculated flow rate.

As a result, it is possible to prevent an unnatural behavior when the output is switched from the zero value to the calculated flow rate while providing the zero output function of outputting the zero value regardless of the calculated flow rate when the fluid control valve is in the closed state.

Here, an execution condition for executing the zero output function will be examined.

For example, at the time of an abnormality such as a seat leak of the fluid control valve or a failure of the pressure sensor, the calculated flow rate may become an abnormal value greatly deviating from the zero value even though the fluid control valve is in the closed state.

In such a case, when a zero value is output only on the condition that the fluid control valve is in the closed state, the above-described abnormal value is hidden (not output) by the zero value, and thus it becomes difficult to detect various abnormalities and the like.

Therefore, when the fluid control valve is in the closed state and an absolute difference between the measured pressure of the upstream pressure sensor and the measured pressure of the downstream pressure sensor is smaller than a predetermined execution threshold, the switching unit preferably executes the zero output function and causes the flow rate output unit to output a zero value.

With such a configuration, even when the fluid control valve is in the closed state, when the absolute difference between the measured pressure of the upstream pressure sensor and the measured pressure of the downstream pressure sensor is larger than the predetermined execution threshold, the zero output function is not executed. Therefore, the above-described abnormal value can be output, and various abnormalities and the like can be promptly detected.

The execution threshold is preferably larger than at least the stop threshold.

In this case, the above-described abnormal value can be output while the zero output function is provided.

As described above, according to the fluid control device of the present invention, it is possible to prevent a negative value from being output immediately after the output is switched from the zero value to the calculated flow rate.

However, for example, at the time of an abnormality such as a failure of a pressure sensor, a large value (abnormal value) may be calculated as the calculated flow rate although the fluid control valve is in the closed state. In such a case, when the zero value continues to be output, the abnormal value is hidden (not output) due to the zero value, and thus, there is a possibility that the detection of the abnormality or the like is delayed.

Therefore, when the switching unit satisfies either the following first stop condition or second stop condition, it is preferable to stop the zero output function and cause the flow rate output unit to output the calculated flow rate.
(First Stop Condition)

It is when the fluid control valve is in the open state and a difference obtained by subtracting a measured pressure of the downstream pressure sensor from a measured pressure of the upstream pressure sensor is larger than the stop threshold.
(Second Stop Condition)

It is when an absolute difference between a measured pressure of the upstream pressure sensor and a measured pressure of the downstream pressure sensor is larger than a predetermined upper limit value larger than the stop threshold.

With such a configuration, since the zero output function is stopped even when the second stop condition is satisfied, an abnormal value can be output, and various abnormalities and the like can be promptly detected.

In order to output the above-described abnormal negative value while preventing unnatural behavior, the upper limit value is preferably larger than at least the stop threshold.

In addition, the fluid control system according to the present invention is characterized in that the above-described fluid control device is disposed in a part or all of a plurality of branch flow paths coupled to a main flow path and provided in parallel.

Such a fluid control system can achieve the same effects as those of the fluid control device described above.

Furthermore, a program for a fluid control device according to the present invention is a program for a fluid control device in which a fluid control valve, an upstream pressure sensor, and a downstream pressure sensor are provided on a flow path, the program causing a computer to function as: an actual flow rate calculation unit configured to calculate a flow rate based on measured pressures of the upstream pressure sensor and the downstream pressure sensor; and a flow rate output unit configured to output a calculated flow rate calculated by the actual flow rate calculation unit, in which in a configuration in which, when it is determined that the fluid control valve is in a closed state, the flow rate output unit exhibits a zero output function that is a function of outputting a zero value regardless of the calculated flow rate, the program further causes the computer to function as a switching unit configured to switch execution and stop of the zero output function by the flow rate output unit, and the switching unit stops the zero output function and causes the flow rate output unit to output the calculated flow rate when the fluid control valve is in an open state and a difference obtained by subtracting the measured pressure of the downstream pressure sensor from the measured pressure of the upstream pressure sensor is larger than a predetermined stop threshold.

In addition, a fluid control method according to the present invention is a fluid control method using a fluid control device in which a fluid control valve, an upstream pressure sensor, and a downstream pressure sensor are provided on a flow path, the fluid control method including the steps of: calculating a flow rate based on measured pressures of the upstream pressure sensor and the downstream pressure sensor; and outputting a calculated flow rate calculated by the actual flow rate calculation unit, in which in a method in which, in the outputting of the calculated flow rate, when it is determined that the fluid control valve is in a closed state, a zero value is output regardless of the calculated flow rate, the method further includes switching between execution and stop of the output of the zero value by the outputting of the calculated flow rate, and when the fluid control valve is in an open state and a difference obtained by subtracting the measured pressure of the downstream pressure sensor from the measured pressure of the upstream pressure sensor is larger than a predetermined stop threshold in the switching, the calculated flow rate is output in the outputting of the calculated flow rate.

According to such a program for a fluid control device and a fluid control method, the same effects as those of the fluid control device described above can be obtained.

As described in the related art, immediately after the fluid control valve is switched from the closed state to the open state, for example, a large flow rate flows in the flow path coupled to the downstream side of the mass flow controller, and a negative flow rate may be output due to backflow of a part of the fluid to the mass flow controller.

Therefore, one object of the present invention is to prevent a negative flow rate from being output and to suppress an unnatural behavior of the output.

That is, another aspect of the fluid control device according to the present invention is characterized in that a fluid control valve, an upstream pressure sensor, and a downstream pressure sensor are provided on a flow path, and the fluid control device includes: an actual flow rate calculation unit configured to calculate a flow rate based on measured pressures of the upstream pressure sensor and the downstream pressure sensor; and a flow rate output unit configured to output a calculated flow rate calculated by the actual flow rate calculation unit, and the flow rate output unit exerts a negative burst cutting function that is a function of outputting a zero value regardless of the calculated flow rate when the fluid control valve is in an open state and the flow rate calculated by the actual flow rate calculation unit is a negative flow rate.

According to the fluid control device configured as described above, when the flow rate calculated by the actual flow rate calculation unit is a negative flow rate, the flow rate output unit exerts a negative burst cutting function of outputting a zero value, so that an unnatural behavior of the output can be suppressed.

Factors for calculating the negative flow rate include not only the backflow to the mass flow controller described above but also, for example, a failure of a fluid control valve, an abnormality of a sensor, or the like. When an abnormal value output due to such a failure or abnormality is hidden due to a zero value, it becomes difficult to detect the failure or abnormality.

Therefore, it is preferable that the negative burst cutting function is stopped when an elapsed time after the fluid control valve is opened exceeds a predetermined set time.

In this case, for example, when the set time is set longer than the time during which the backflow to the mass flow controller is likely to stop, the negative burst cutting function stops when the negative flow rate continues to be calculated even though the set time has been exceeded, and thus, it is possible to promptly detect the above-described failure or abnormality.

In the above-described configuration, in order to flexibly set the set time, the set time is preferably changeable.

Since there is a case where it is desired to output a negative flow rate depending on a user or a process, it is preferable that whether to cause the flow rate output unit to exhibit the negative burst cutting function can be selected.

Further, a program for a fluid control device according to the present invention is used in a fluid control device in which a fluid control valve, an upstream pressure sensor, and a downstream pressure sensor are provided on a flow path, and causes a computer to exhibit a function as an actual flow rate calculation unit configured to calculate a flow rate based on measured pressures of the upstream pressure sensor and the downstream pressure sensor; and a flow rate output unit configured to output a calculated flow rate calculated by the actual flow rate calculation unit, in which the flow rate output unit exerts a negative burst cutting function that is a function of outputting a zero value regardless of the calculated flow rate when the fluid control valve is in an open state and the flow rate calculated by the actual flow rate calculation unit is a negative flow rate.

Furthermore, a fluid control method according to the present invention is a method using a fluid control device in which a fluid control valve, an upstream pressure sensor, and a downstream pressure sensor are provided on a flow path, the method including the steps of: calculating a flow rate based on measured pressures of the upstream pressure sensor and the downstream pressure sensor; and outputting a calculated flow rate calculated by the actual flow rate calculation unit, in which in the outputting of the calculated flow rate, when the fluid control valve is in an open state and the flow rate calculated by the actual flow rate calculation unit is a negative flow rate, a negative burst cutting function that is a function of outputting a zero value regardless of the calculated flow rate is exhibited.

According to such a program for a fluid control device and a fluid control method, the same effects as those of the fluid control device described above can be obtained.

According to the present invention described above, it is possible to suppress an unnatural behavior of the calculated flow rate output from the fluid control device.

DETAILED DESCRIPTION

First Embodiment

Hereinafter, a fluid control device according to a first embodiment of the present invention will be described with reference to the drawings.

<Device Configuration>

Figure 1:
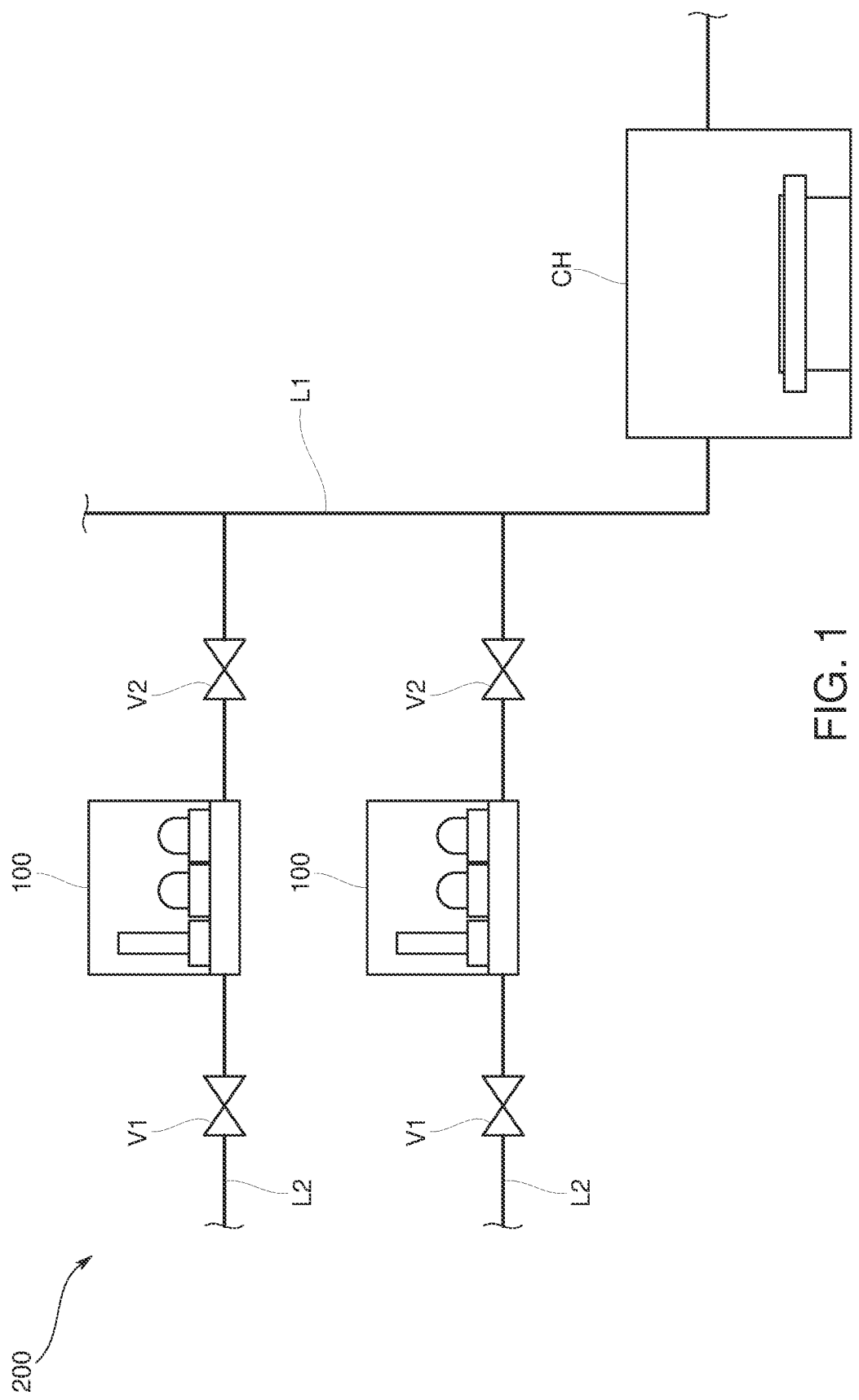
FIG. 1 is a schematic diagram illustrating a configuration of a fluid control system according to an embodiment of the present invention.

A fluid control device 100 of the present embodiment is used, for example, in a semiconductor manufacturing process, and constructs a fluid control system 200 that controls a flow rate of a fluid supplied to a process chamber CH as illustrated in FIG. 1.

In the fluid control system 200, the above-described fluid control device 100 is disposed in a part or all of a plurality of flow paths L2 (hereinafter, also referred to as a branch flow path L2) provided in parallel, and the downstreams of the plurality of branch flow paths L2 are coupled to, for example, a main flow path L1 communicating with the process chamber CH. Note that the main flow path L1 is a flow path that can suddenly have a higher pressure than an inside of the fluid control device 100. Further, shut-off valves V1 and V2 are provided on an upstream side and a downstream side of the fluid control device 100 in the branch flow path L2, respectively.

Figure 2:
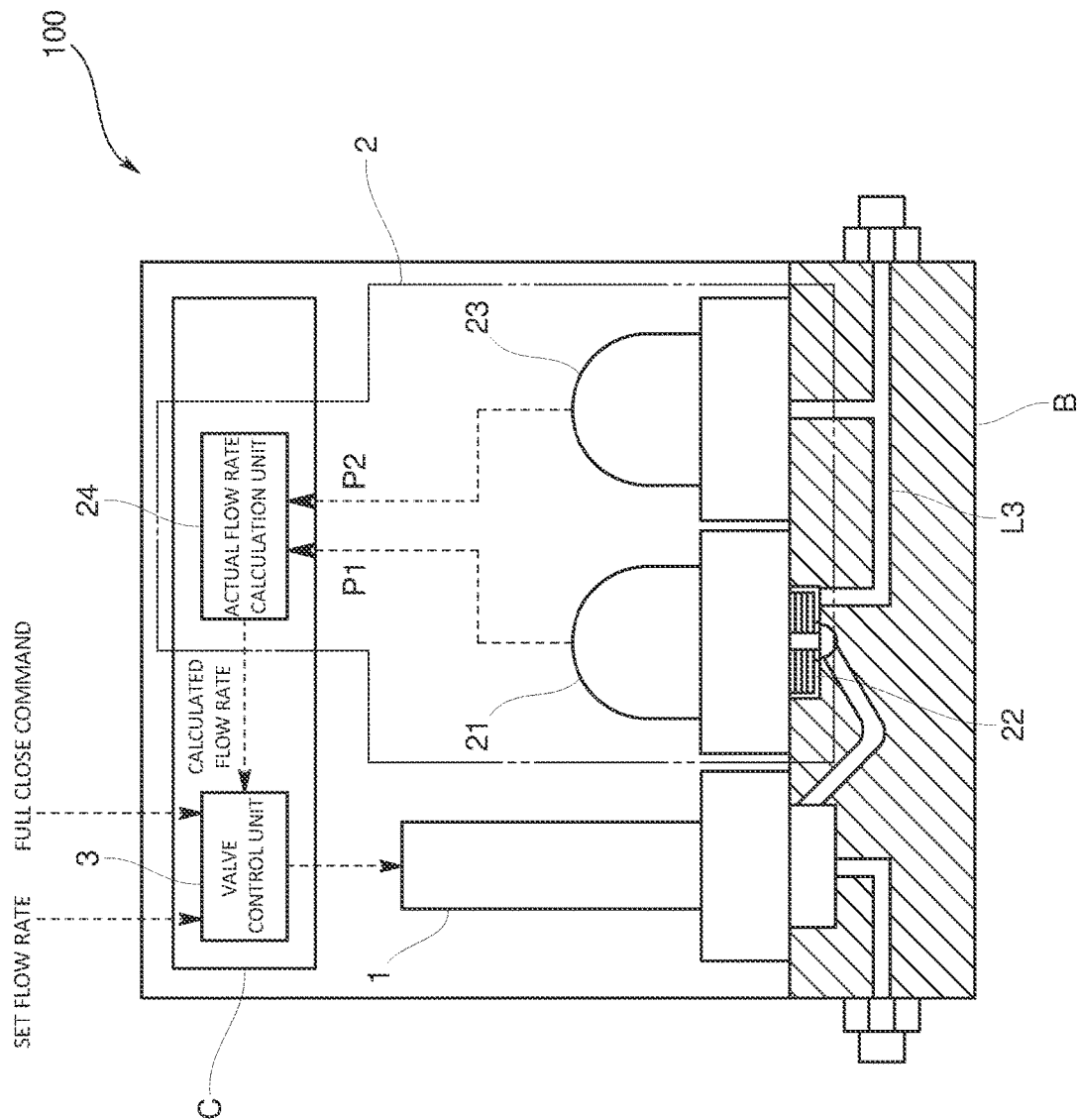
FIG. 2 is a schematic diagram illustrating a configuration of a fluid control device according to the embodiment.

As illustrated in FIG. 2, the fluid control device 100 is a differential pressure-type mass flow controller in which a fluid control valve 1, an upstream pressure sensor 21, a fluid resistance element 22, and a downstream pressure sensor 23 are disposed in this order from the upstream side, and a control unit C that controls the fluid control valve 1 is packaged together with these fluid devices 21 to 23. More specifically, the mass flow controller 100 includes a block B in which an internal flow path L3 is formed, and the above-described various fluid devices 21 to 23 are attached to the block B, so that these fluid devices 21 to 23 are disposed on the internal flow path L3. As the fluid control device 100, a pressure sensor may be further provided on the upstream side of the fluid control valve 1.

The control unit C is a so-called computer including a CPU, a memory, an A/D converter, a D/A converter, and various input/output devices, and functions as at least an actual flow rate calculation unit 24 and a valve control unit 3 by executing a program for a fluid control device stored in the memory as illustrated in FIG. 2.

The actual flow rate calculation unit 24 calculates a flow rate of a fluid flowing through the internal flow path L3 from a measured pressure P1 measured by the upstream pressure sensor 21 and a measured pressure P2 measured by the downstream pressure sensor 23. That is, the upstream pressure sensor 21, the fluid resistance element 22, the downstream pressure sensor 23, and the actual flow rate calculation unit 24 constitute a differential pressure-type flow rate sensor 2. The calculated flow rate calculated by the actual flow rate calculation unit 24 is output to the valve control unit 3.

The valve control unit 3 performs flow rate feedback control on an opening degree of the fluid control valve 1 so that a deviation between a set flow rate set by a user and the calculated flow rate calculated by the actual flow rate calculation unit 24 becomes small.

Figure 3:
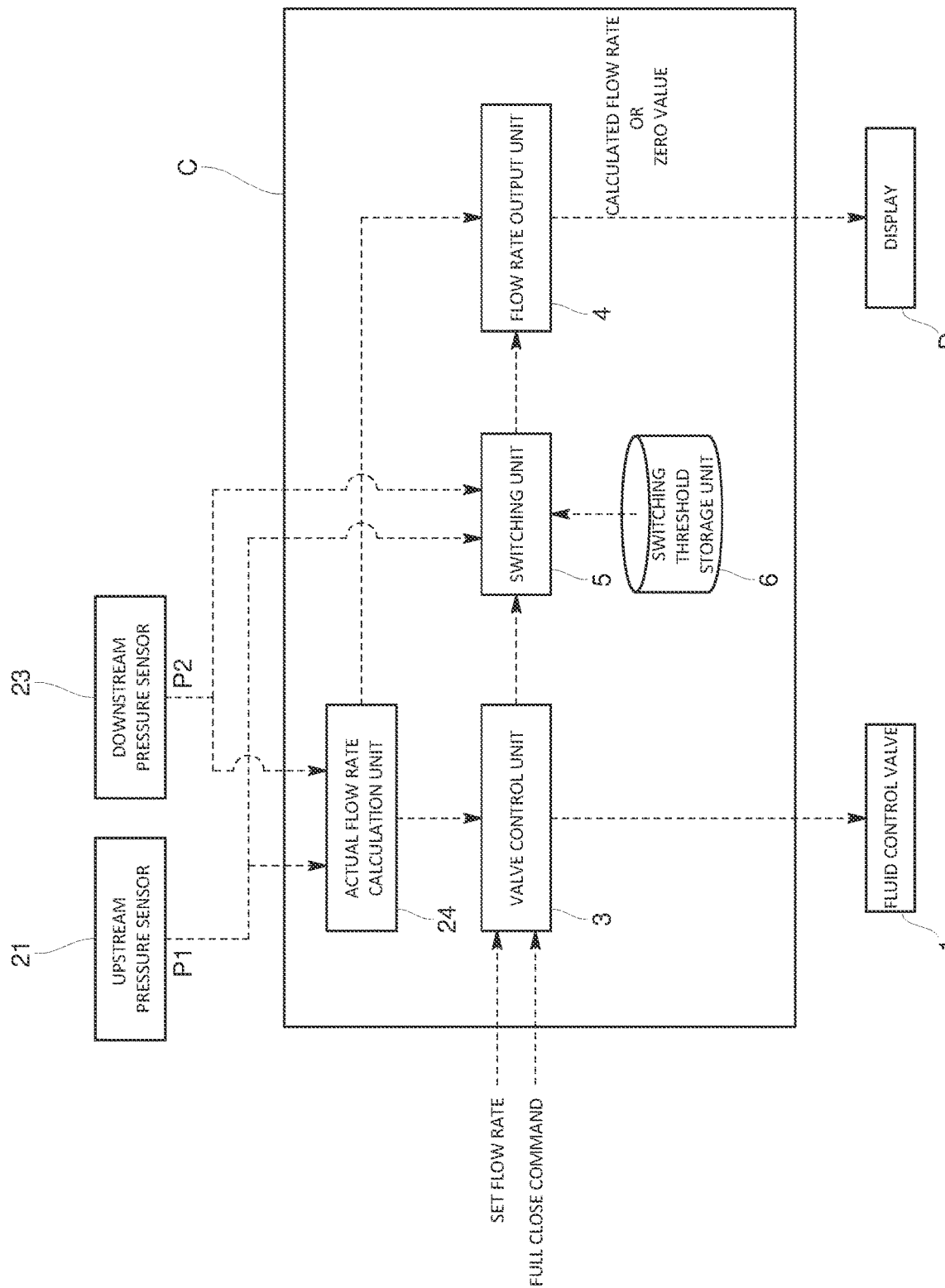
FIG. 3 is a functional block diagram illustrating functions of a control unit according to the embodiment.

Here, as illustrated in FIG. 3, the control unit C of the present embodiment includes a flow rate output unit 4 that outputs the calculated flow rate to, for example, a display D or the like.

In such a configuration, for example, when the valve control unit 3 receives a full close command and closes the fluid control valve 1, the output by the flow rate output unit 4 is normally considered to be a zero value.

However, due to various factors such as a seat leak of the fluid control valve 1 and a backflow from the main flow path L1 to the branch flow path L2, a difference may occur between the measured pressure P1 of the upstream pressure sensor 21 and the measured pressure P2 of the downstream pressure sensor 23 even though the fluid control valve 1 is in a closed state. Then, the flow rate corresponding to the difference is calculated by the actual flow rate calculation unit 24, and the calculated flow rate different from the zero value may be output by the flow rate output unit 4 even though there is no problem in use as the fluid control device 100.

Therefore, the flow rate output unit 4 of the present embodiment is configured to exhibit a zero output function that is a function of outputting a zero value regardless of the calculated flow rate when it is determined that the fluid control valve 1 is in the closed state.

Here, "outputting a zero value" means that there is substantially no flow rate of the fluid, and examples of a specific aspect include an aspect in which a number "0" may be output in a region of the display D indicating the flow rate and an aspect in which a straight line indicating that the flow rate is zero may be output in a graph indicating a temporal change of the flow rate. However, the present invention is not limited to the above-described aspects as long as it indicates that the flow rate of the fluid is substantially absent.

As illustrated in FIG. 2, the valve control unit 3 described above is configured to control the fluid control valve 1 based on a full close command for forcibly fully closing the fluid control valve 1 or a set flow rate set as a target value of a calculated flow rate. That is, the valve control unit 3 attempts to close the fluid control valve 1 when the valve control unit 3 receives a full close command or a zero value as the set flow rate.

In view of such operation of the valve control unit 3, the flow rate output unit 4 is configured to output a zero value regardless of the calculated flow rate at least when the valve control unit 3 receives a full close command or when the valve control unit 3 receives a zero value as a set flow rate. The timing at which the flow rate output unit 4 outputs the zero value may be immediately after the valve control unit 3 receives the full close command or immediately after the valve control unit 3 receives the zero value as the set flow rate, or may be after a predetermined condition is satisfied, for example, after a predetermined time elapses after the valve control unit 3 receives the full close command or the zero value as the set flow rate.

However, in the configuration in which the flow rate output unit 4 exhibits the zero output function as described above, the control unit C of the present embodiment further includes the switching unit 5 that switches execution and stop of the zero output function by the flow rate output unit 4 as illustrated in FIG. 3.

The switching unit 5 is configured to execute the zero output function in a case where a predetermined execution condition is satisfied, and stop the zero output function in a case where a predetermined stop condition is satisfied.

Figure 4:
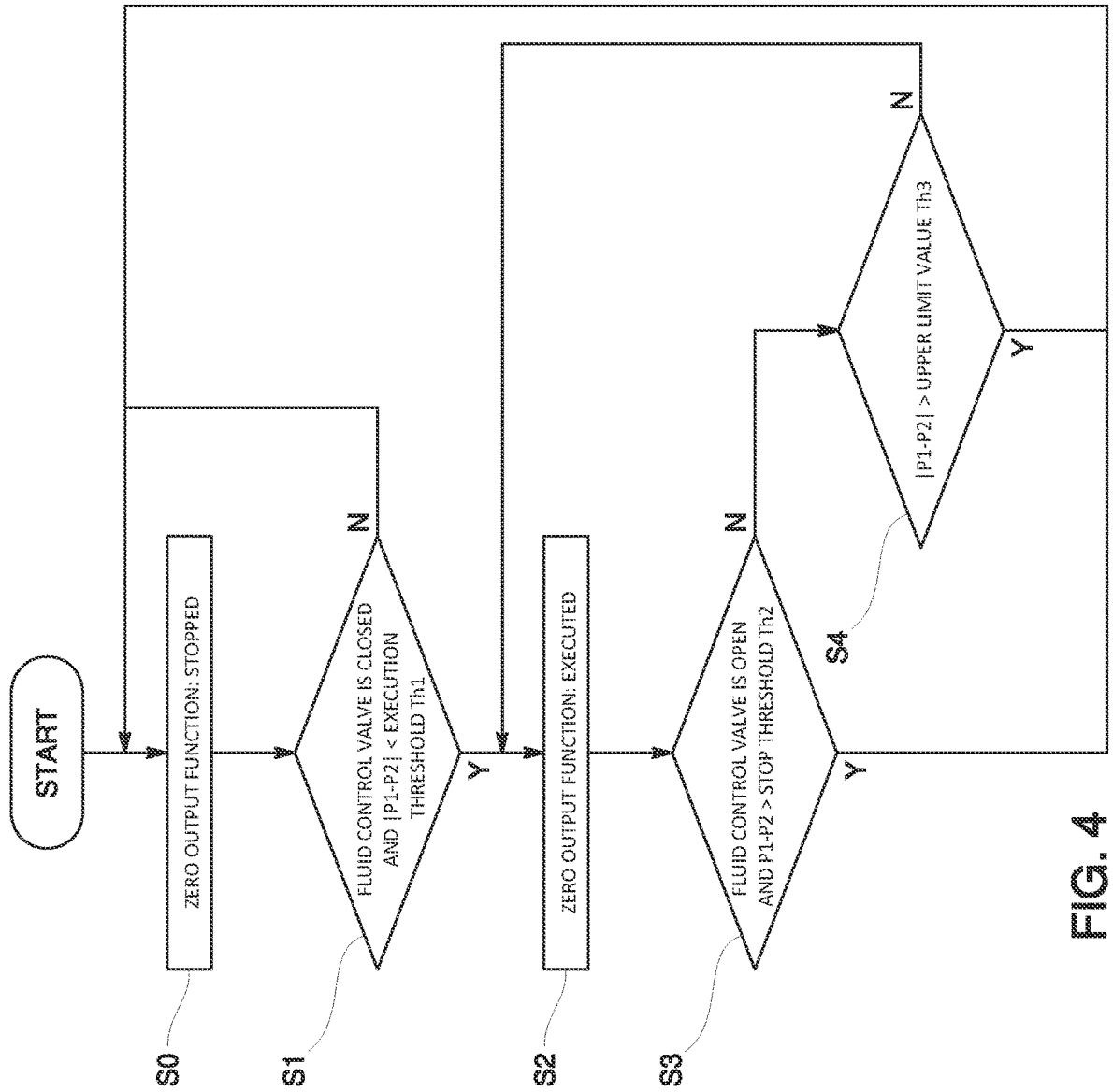
FIG. 4 is a flowchart illustrating operations of the control unit according to the embodiment.

Hereinafter, operations of the switching unit 5 will be described with reference to the flowchart of FIG. 4.

First, an operation when the switching unit 5 executes the zero output function will be described. When the fluid control device 100 is powered on, the zero output function is stopped (S0).

The execution condition includes at least that the fluid control valve 1 is in the closed state.

Here, for example, at the time of an abnormality such as a seat leak of the fluid control valve 1 or a failure of the pressure sensors 21 and 23, the calculated flow rate may become an abnormal value greatly deviating from the zero value even though the fluid control valve 1 is in the closed state.

In such a case, if a zero value is output only on the condition that the fluid control valve 1 is in the closed state as the execution condition, the abnormal value of the calculated flow rate described above is hidden (not output) by the zero value, and thus it becomes difficult to detect the abnormality or the like described above.

Therefore, in the present embodiment, it is set as the execution condition that the fluid control valve 1 is in the closed state and an absolute difference |P1−P2| between a measured pressure P1 of the upstream pressure sensor 21 and a measured pressure P2 of the downstream pressure sensor 23 is smaller than a predetermined execution threshold Th1.

The execution threshold Th1 is stored in advance in a switching threshold storage unit 6 set in a predetermined area of the memory (see FIG. 3). The execution threshold Th1 is set to a value larger than at least a stop threshold Th2 to be described later. Specifically, the execution threshold Th1 is set to be equal to or larger than a value that does not normally appear as the absolute difference |P1−P2| when the fluid control valve 1 is in the closed state.

Based on this execution condition, the switching unit 5 determines whether the fluid control valve 1 is in the closed state and the absolute difference |P1−P2| between the measured pressure P1 of the upstream pressure sensor 21 and the measured pressure P2 of the downstream pressure sensor 23 is smaller than the predetermined execution threshold Th1, that is, whether the execution condition is satisfied (S1). Regarding the determination on whether the fluid control valve 1 is in the closed state, the switching unit 5 determines that the fluid control valve 1 is in the closed state when the valve control unit 3 has received the full close command or when the valve control unit 3 has received a zero value as the set flow rate, and determines that the fluid control valve 1 is in an open state otherwise. Further, the determination in S1 may be executed after the valve control unit 3 receives the full close command or after the valve control unit 3 receives the zero value as the set flow rate, or may be executed immediately after S0 regardless of the reception of the full close command or the zero value described above.

Then, when the execution condition is satisfied in S1, the switching unit 5 executes the zero output function and causes the flow rate output unit 4 to output a zero value (S2).

On the other hand, when the execution condition is not satisfied in S1, the switching unit 5 causes the flow rate output unit 4 to output a calculated flow rate without executing the zero output function, that is, while maintaining the stop of the zero output function (S0).

After executing the zero output function in S2, the switching unit 5 proceeds to determination as to whether a stop condition described below is satisfied.

In the present embodiment, the stop condition (hereinafter, also referred to as a first stop condition) is set such that the fluid control valve 1 is in the open state (in other words, the fluid control valve 1 is not in the closed state) and a difference P1−P2 obtained by subtracting the measured pressure P2 of the downstream pressure sensor 23 from the measured pressure P1 of the upstream pressure sensor 21 is larger than the predetermined stop threshold Th2. The stop threshold Th2 is a value of at least 0 or more, but is preferably a positive value larger than 0.

Incidentally, for example, at the time of an abnormality such as a failure of the pressure sensors 21 and 23, a large value (abnormal value) may be calculated as the calculated flow rate even though the fluid control valve 1 is in the closed state. In such a case, when the above-described first stop condition is satisfied and a zero value is continuously output, a large abnormal value is hidden (not output) due to the zero value, and thus, there is a possibility that detection of the abnormality or the like is delayed.

Therefore, in the present embodiment, it is set as a stop condition (hereinafter, also referred to as a second stop condition) that the absolute difference |P1−P2| between the measured pressure P1 of the upstream pressure sensor 21 and the measured pressure P2 of the downstream pressure sensor 23 is larger than a predetermined upper limit value Th3, and the switching unit 5 stops the zero output function when either the first stop condition or the second stop condition is satisfied.

The upper limit value Th3 is stored in advance in the switching threshold storage unit 6 (see FIG. 2). The upper limit value Th3 is set to a value larger than at least the stop threshold Th2 described above. Specifically, the upper limit value Th3 is set to a value or more that does not appear in a normal time as the absolute difference |P1−P2| when the fluid control valve 1 is in the closed state. Note that the upper limit value Th3 may be equal to or larger than the execution threshold Th1 described above, or may be equal to or smaller than the execution threshold Th1.

Based on these stop conditions, the switching unit 5 determines whether the fluid control valve 1 is in the open state and the difference P1−P2 obtained by subtracting the measured pressure P2 of the downstream pressure sensor 23 from the measured pressure P1 of the upstream pressure sensor 21 is larger than the predetermined stop threshold Th2, that is, whether the first stop condition is satisfied (S3), and determines whether the absolute difference |P1−P2| between the measured pressure P1 of the upstream pressure sensor 21 and the measured pressure P2 of the downstream pressure sensor 23 is larger than the predetermined upper limit value Th3, that is, whether the second stop condition is satisfied (S4). The determination in S3 may be executed after the valve control unit 3 receives a value larger than the zero value as the set flow rate, or may be executed immediately after S2 regardless of the reception of the set flow rate.

Then, when either the first stop condition or the second stop condition is satisfied in S3 and S4, the switching unit 5 stops the zero output function and causes the flow rate output unit 4 to output the calculated flow rate (S0).

On the other hand, when both the first stop condition and the second stop condition are not satisfied in S3 and S4, the switching unit 5 causes the flow rate output unit 4 to output a zero value without stopping the zero output function, that is, while maintaining the execution of the zero output function (S2).

After stopping the zero output function in S5, the switching unit 5 returns to S1 to determine whether the execution condition is satisfied.

Effects of First Embodiment

According to the fluid control device 100 configured as described above, since the stop condition of the zero output function includes not only the fact that the fluid control valve 1 is in the open state but also the fact that the difference P1−P2 obtained by subtracting the measured pressure P2 of the downstream pressure sensor 23 from the measured pressure P1 of the upstream pressure sensor 21 is larger than the predetermined stop threshold Th2, it is possible to prevent a negative value from being output immediately after the zero output function is stopped and the output is switched from the zero value to the calculated flow rate.

Figure 5:
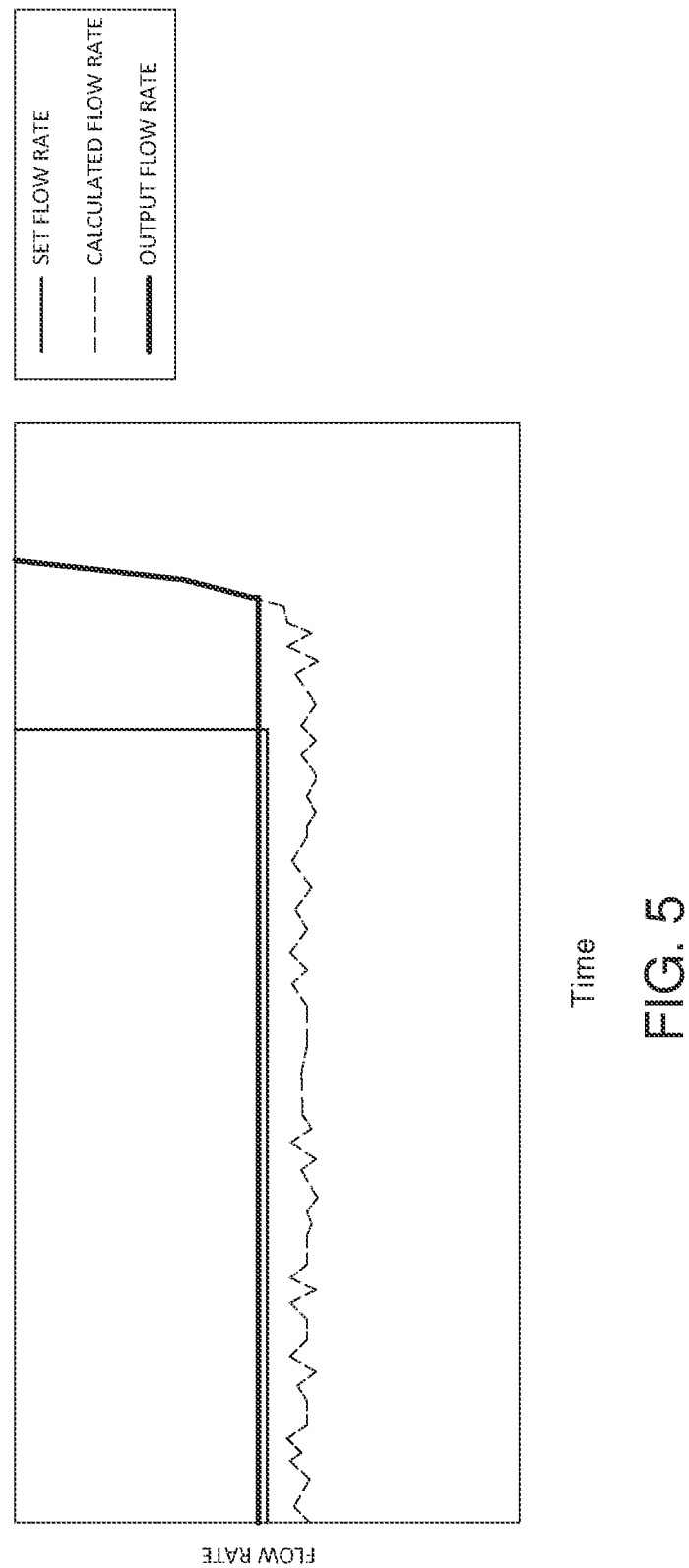
FIG. 5 is a graph illustrating an output of the fluid control device of the embodiment.

As a result, as shown in FIG. 5, in the fluid control device 100 configured to output a zero value regardless of the calculated flow rate when the fluid control valve 1 is in the closed state, it is possible to prevent an unnatural behavior when the output flow rate is switched from the zero value to the calculated flow rate.

In addition, the execution condition of the zero output function includes not only the fact that the fluid control valve 1 is in the closed state but also the fact that the absolute difference |P1−P2| between the measured pressure P1 of the upstream pressure sensor 21 and the measured pressure P2 of the downstream pressure sensor 23 is smaller than the predetermined execution threshold Th1. Therefore, even when the fluid control valve 1 is in the closed state, when the absolute difference |P1−P2| between the measured pressure P1 of the upstream pressure sensor 21 and the measured pressure P2 of the downstream pressure sensor 23 is larger than the predetermined execution threshold Th1, the zero output function is not executed, abnormal values caused by various factors can be output without being hidden, and various abnormalities and the like can be promptly detected.

Furthermore, since the execution threshold Th1 is set to be equal to or larger than the value that does not appear at the normal time as the absolute difference |P1−P2| when the fluid control valve 1 is in the closed state, an abnormal value can be output without being hidden when the abnormal value occurs, while securing the operation effect by the zero output function.

Furthermore, since the zero output function is stopped even when the switching unit 5 satisfies the second stop condition, when a large negative value is calculated, the negative value can be output without being hidden, and various abnormalities and the like can be promptly detected.

In addition, since the upper limit value Th3 included in the second stop condition is larger than at least the stop threshold Th2, an abnormal negative value can be output while an unnatural behavior is prevented.

Modification of First Embodiment

The present invention is not limited to the first embodiment.

For example, in the first embodiment, the execution threshold Th1 has been described as a value larger than the stop threshold Th2, but the execution threshold Th1 and the stop threshold Th2 may be equal to each other.

In addition, the functions of the actual flow rate calculation unit 24, the valve control unit 3, the flow rate output unit 4, the switching unit 5, and the switching threshold storage unit 6 are not necessarily exerted by one CPU, and some of these functions may be exerted by another CPU.

Figure 6:
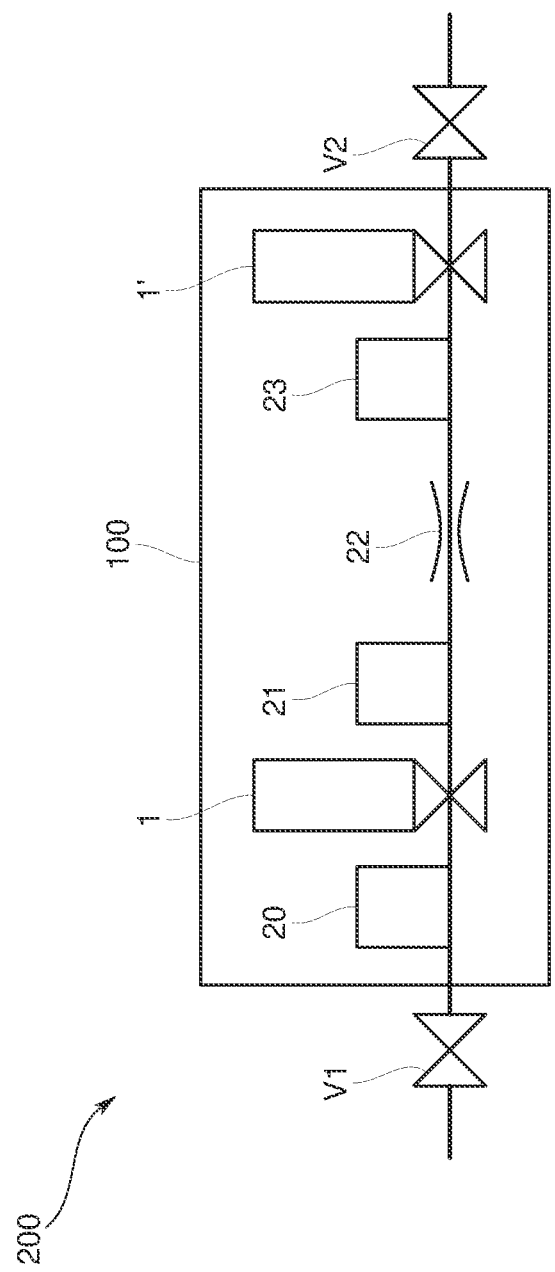
FIG. 6 is a schematic diagram illustrating a configuration of a fluid control device according to another embodiment.
Figure 7:
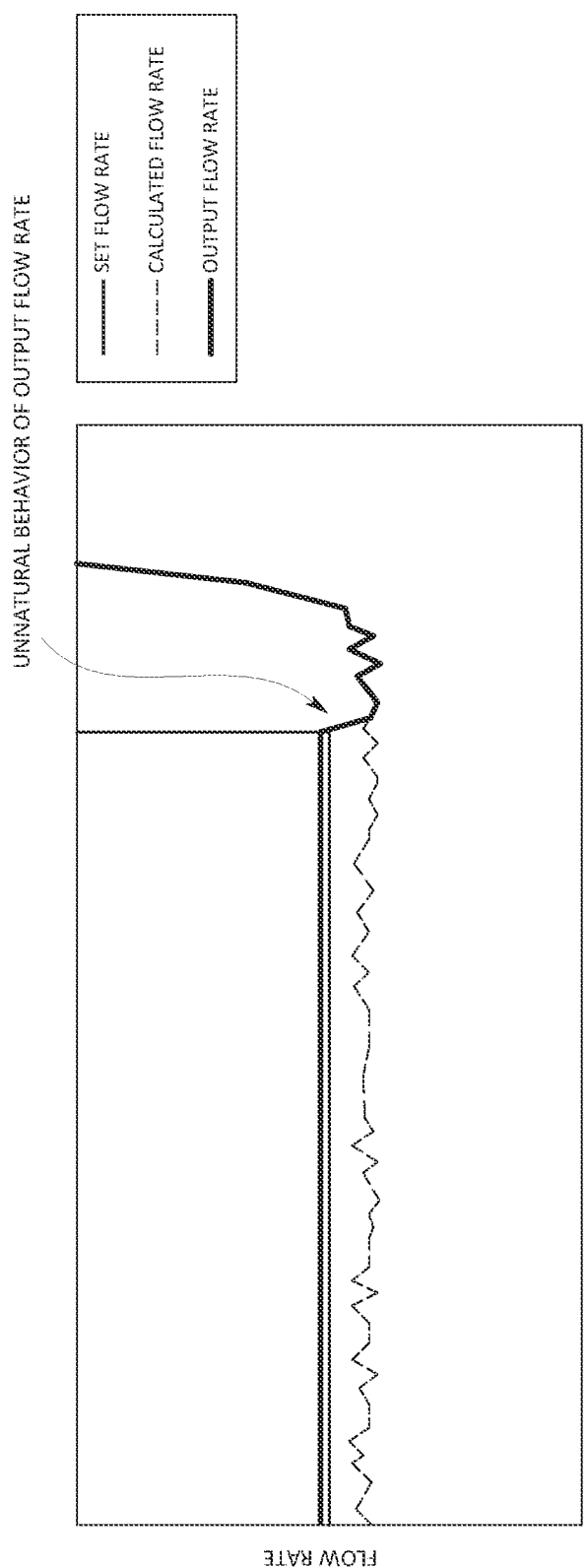
FIG. 7 is a graph for describing an unnatural behavior of an output flow rate generated in a conventional configuration.

The fluid control device 100 is configured to include one fluid control valve 1 in the first embodiment, but may further include a second fluid control valve 1' provided on the downstream side of the downstream pressure sensor 23 separately from the fluid control valve 1 of the embodiment as illustrated in FIG. 6.

In this case, "the fluid control valve is in the closed state" in the claims means that one or both of the fluid control valve 1 and the second fluid control valve 1' are in the closed state, and "the fluid control valve is in the open state" means that both of the fluid control valve 1 and the second fluid control valve 1' are in the open state.

As shown in FIG. 6, the fluid control device 100 may further include a pressure sensor 20 provided on the upstream side of the fluid control valve 1.

Second Embodiment

Next, a fluid control device according to a second embodiment of the present invention will be described with reference to the drawings.

<Device Configuration>

As in the first embodiment, the fluid control device 100 of the present embodiment is used, for example, in a semiconductor manufacturing process, and constructs a fluid control system 200 in which a plurality of fluid control devices 100 controls a flow rate of a fluid supplied to a process chamber.

Figure 8:
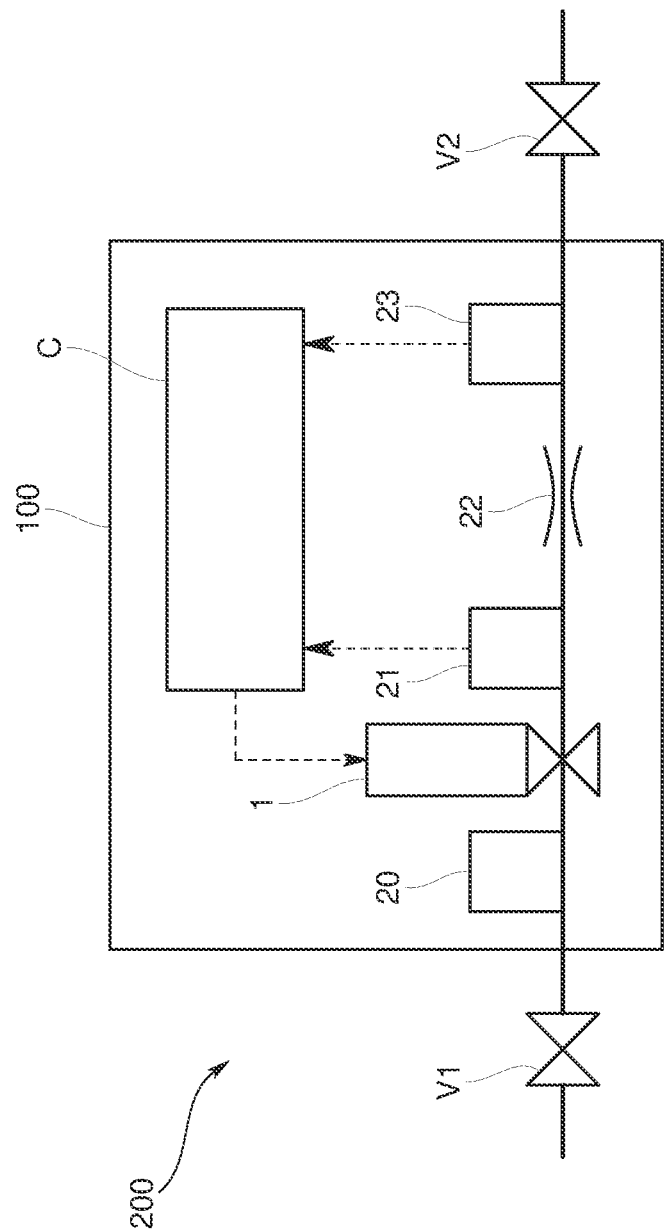
FIG. 8 is a schematic diagram illustrating a configuration of a fluid control device according to a second embodiment.

As illustrated in FIG. 8, each fluid control device 100 is different from the device configuration of the first embodiment in that a third pressure sensor 20 provided on the upstream side of the fluid control valve 1 is further provided in addition to the upstream pressure sensor 21 and the downstream pressure sensor 23.

Furthermore, in the fluid control device 100, since the function of the control unit C is different from that of the first embodiment, the control unit C will be described in detail below.

Figure 9:
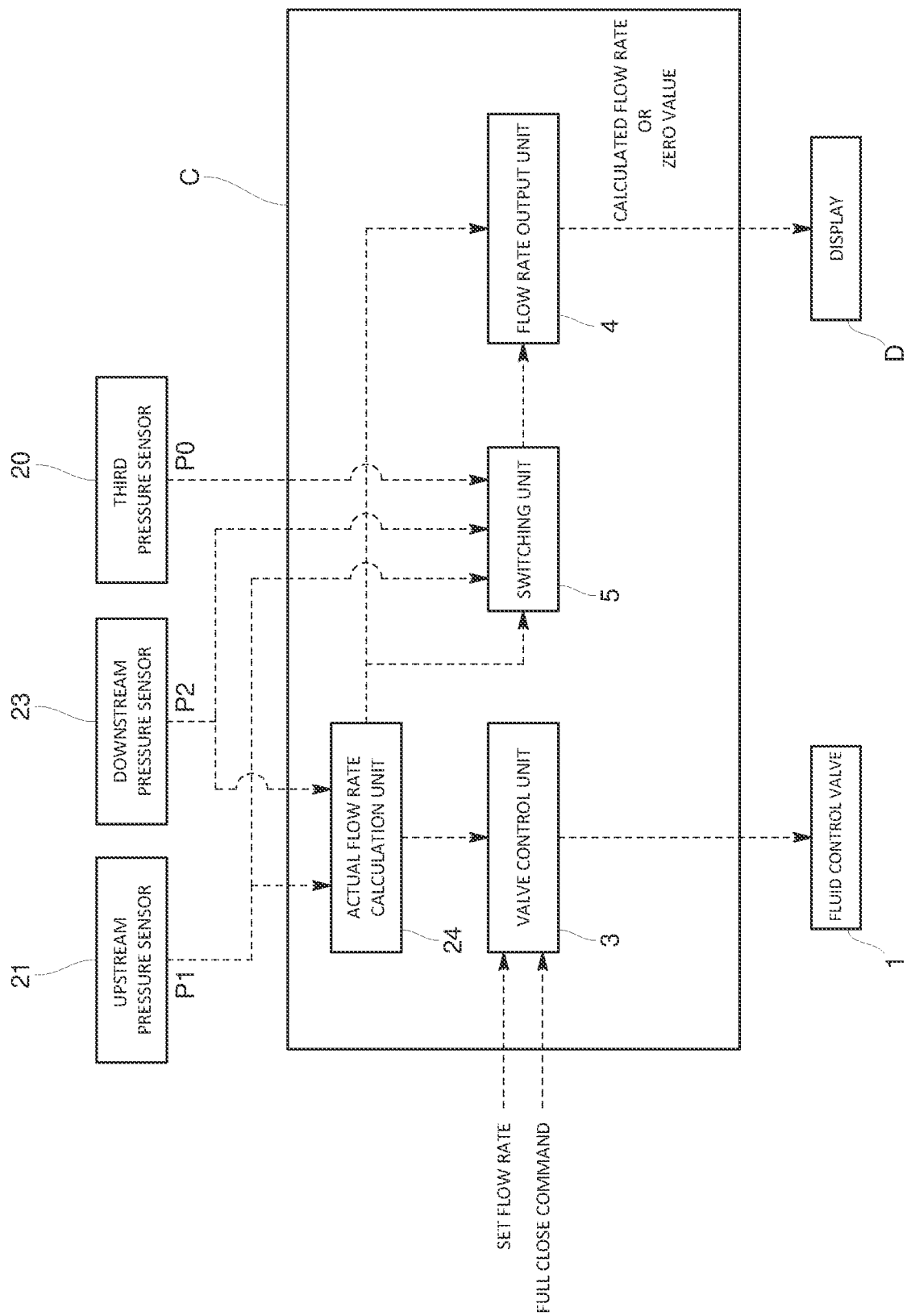
FIG. 9 is a functional block diagram illustrating functions of a control unit according to the second embodiment.

As illustrated in FIG. 9, the control unit C is common to the first embodiment in exerting functions as the actual flow rate calculation unit 24, the valve control unit 3, and the flow rate output unit 4.

The flow rate output unit 4 of the present embodiment is configured to exhibit a negative burst cutting function which is a function of outputting a zero value regardless of the calculated flow rate when the fluid control valve 1 is in the open state and the flow rate calculated by the actual flow rate calculation unit 24 is a negative flow rate.

In the second embodiment, the flow rate output unit 4 may or may not exhibit the zero output function in the first embodiment.

Further, "outputting a zero value" means that, as in the first embodiment, there is substantially no flow rate of the fluid, and examples of a specific aspect include an aspect in which a number "0" may be output in a region of the display D indicating the flow rate and an aspect in which a straight line indicating that the flow rate is zero may be output in a graph indicating a temporal change of the flow rate. However, the present invention is not limited to the above-described aspects as long as it indicates that the flow rate of the fluid is substantially absent.

Furthermore, as illustrated in FIG. 9, the control unit C of the present embodiment includes a switching unit 5 that switches execution and stop of the negative burst cutting function by the flow rate output unit 4.

More specifically, the switching unit 5 stops the negative burst cutting function when the elapsed time after the fluid control valve 1 is opened exceeds a predetermined set time.

When the negative burst cutting function is stopped, the flow rate output unit 4 may output the calculated flow rate of the actual flow rate calculation unit 24, or may output a warning indicating that an abnormality has occurred instead of or in addition to the calculated flow rate.

The above-described set time can be changed by a user or a manufacturer.

Here, the upper limit value of the set time is set to about a time when a backflow of the fluid to the fluid control device 100 will stop after an occurrence of the backflow, for example, 60,000 msec.

On the other hand, the lower limit value of the set time is set to 0 msec here. As a result, the negative burst cutting function can be forcibly stopped by changing the set time to 0 msec. That is, in the present embodiment, whether to cause the flow rate output unit 4 to exhibit the negative burst cutting function can be selected, and the negative flow rate calculated by the actual flow rate calculation unit 24 can be output as necessary.

Figure 10:
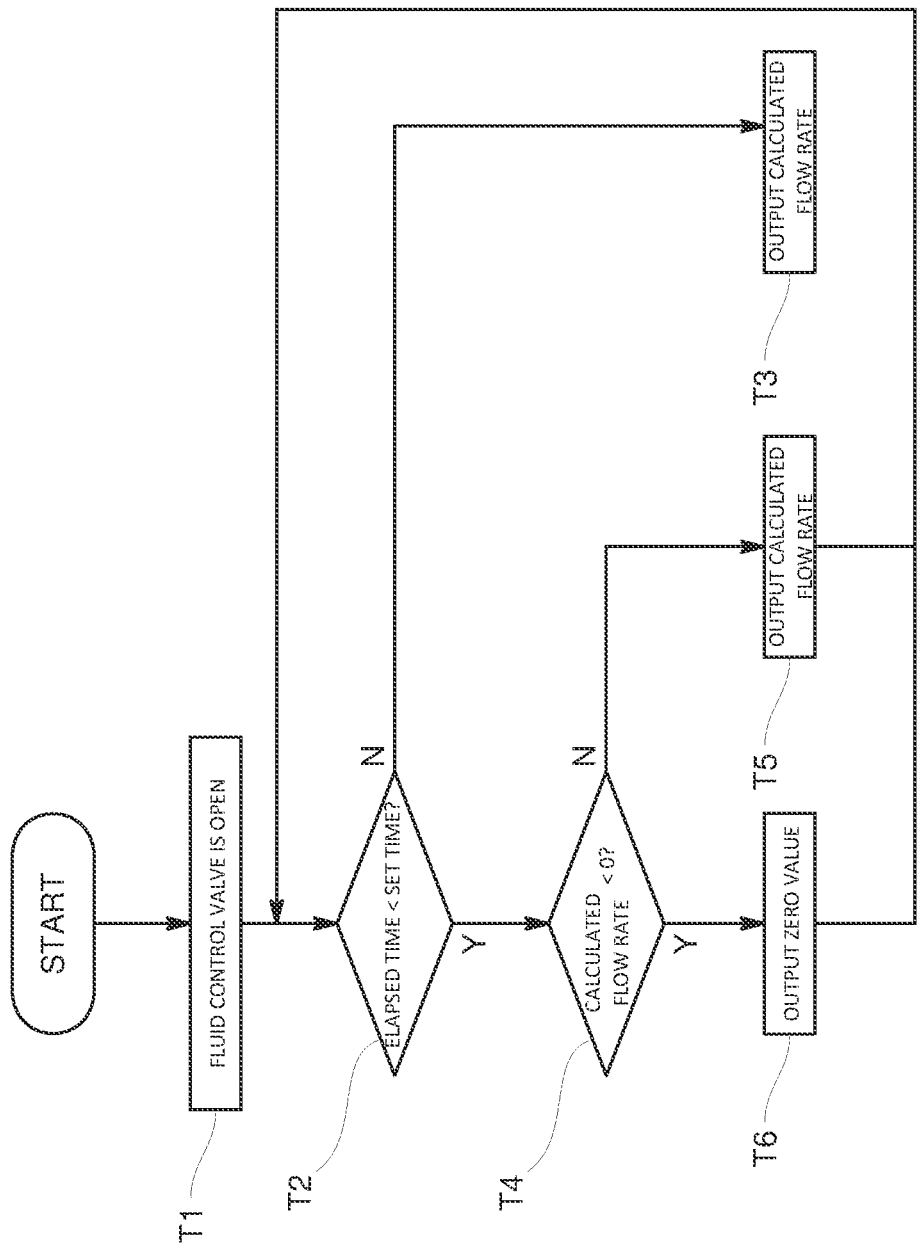
FIG. 10 is a flowchart illustrating operations of the control unit according to the second embodiment.

Next, operations of the control unit C of the present embodiment will be described with reference to the flowchart of FIG. 10.

First, when a set flow rate larger than zero or a full open command is input to the control unit C, the valve control unit 3 changes the fluid control valve 1 from the closed state to the open state (T1).

Next, the flow rate output unit 4 determines whether the elapsed time after the fluid control valve 1 is opened exceeds a predetermined set time (T2).

At T2, when the elapsed time exceeds the set time, the switching unit 5 stops the negative burst cutting function, and the flow rate output unit 4 outputs the calculated flow rate by the actual flow rate calculation unit 24 (T3).

On the other hand, when the elapsed time does not exceed the set time at T2, the flow rate output unit 4 determines whether the calculated flow rate calculated by the actual flow rate calculation unit 24 is a negative flow rate (T4).

When the calculated flow rate is zero or a positive flow rate at T4, the flow rate output unit 4 outputs the calculated flow rate to a display or the like (T5).

On the other hand, when the calculated flow rate is a negative flow rate at T4, the flow rate output unit 4 exerts a negative burst cutting function and outputs a zero value to a display or the like regardless of the calculated flow rate (T6).

After the calculated flow rate is output at T5 and after the zero value is output at T6, the process returns to T2, and the operations from T2 to T5 are repeated. As a result, since the negative burst cutting function is exerted until the elapsed time exceeds the set time, when the calculated flow rate is a negative flow rate, a zero value is output each time. On the other hand, in a case where the negative flow rate continues to be calculated until the set time is exceeded, the negative burst cutting function is stopped at the timing when the elapsed time exceeds the set time, and the negative flow rate is output.

Effects of Second Embodiment

According to the fluid control device 100 configured as described above, when a flow rate calculated by the actual flow rate calculation unit 24 is a negative flow rate, the flow rate output unit 4 exhibits a negative burst cutting function of outputting a zero value, and thus, it is possible to suppress an unnatural behavior of the output.

In addition, when a negative flow rate is continuously calculated by the actual flow rate calculation unit 24 over a predetermined set time, the negative burst cutting function is stopped, so that it is possible to output the negative flow rate calculated due to an abnormality such as a failure of the fluid control valve 1, for example, and promptly detect such an abnormality.

Modification of Second Embodiment

As in the first embodiment, the fluid control device 100 according to the present invention does not necessarily include the third pressure sensor 20 as long as the fluid control device 100 includes the upstream pressure sensor 21 and the downstream pressure sensor 23.

Furthermore, the switching unit 5 may be configured to stop the negative burst cutting function when the calculated flow rate calculated by the actual flow rate calculation unit 24 falls below a preset lower limit value.

In this case, when the flow rate is calculated to be extremely small due to various abnormalities or the like, the abnormality or the like can be promptly detected.

As illustrated in FIG. 6, the fluid control device 100 may further include a second fluid control valve 1' provided on the downstream side of the downstream pressure sensor 23, separately from the fluid control valve 1 of the second embodiment.

In this case, "the fluid control valve is in the open state" in the claims means that both the fluid control valve 1 and the second fluid control valve 1' are in the open state.

As shown in FIG. 6, the fluid control device 100 may further include a pressure sensor 20 provided on the upstream side of the fluid control valve 1.

In addition, the fluid control device 100 of the above embodiment is configured to stop the negative burst cutting function when the elapsed time after the fluid control valve is opened exceeds the predetermined time, but may be configured to execute the negative burst cutting function even after the elapsed time exceeds the predetermined time.

In this case, in order to promptly detect an abnormality or the like, the negative burst cutting function may be stopped when the actual flow rate calculation unit 24 continues to calculate a negative flow rate over a predetermined set time.

Other Embodiments

In each of the above embodiments, the fluid control system 200 including a plurality of fluid control devices 100 has been described, but a single fluid control device 100 may be provided as the fluid control system.

In addition, in each of the above embodiments, the fluid control device 100 has been described as being used in a semiconductor manufacturing process, but the fluid control device 100 according to the present invention can be used in various systems other than the semiconductor manufacturing process.

In addition, various modifications and combinations of the embodiments may be made without departing from the gist of the present invention.

DESCRIPTION OF REFERENCE CHARACTERS

100: fluid control device (mass flow controller)
1: fluid control valve
21: upstream pressure sensor
22: fluid resistance element
23: downstream pressure sensor
L3: internal flow path
C: control unit
24: actual flow rate calculation unit
2: flow rate sensor
3: valve control unit
4: flow rate output unit
5: switching unit
6: switching threshold storage unit

What is claimed is:

1. A fluid control device in which a fluid control valve, an upstream pressure sensor, and a downstream pressure sensor are provided on a flow path, the device comprising:
an actual flow rate calculation unit configured to calculate a flow rate based on measured pressures of the upstream pressure sensor and the downstream pressure sensor; and
a flow rate output unit configured to output a calculated flow rate calculated by the actual flow rate calculation unit,
wherein the flow rate output unit exerts a negative burst cutting function that is a function of outputting a zero value regardless of the calculated flow rate when the fluid control valve is in an open state and the flow rate calculated by the actual flow rate calculation unit is a negative flow rate.

2. The fluid control device according to claim 1, wherein the negative burst cutting function stops when an elapsed time after the fluid control valve is opened exceeds a predetermined set time.

3. The fluid control device according to claim 2, wherein the set time is changeable.

4. The fluid control device according to claim 1, wherein whether to cause the flow rate output unit to exhibit the negative burst cutting function is selectable.

5. A storage medium storing a program for a fluid control device in which a fluid control valve, an upstream pressure sensor, and a downstream pressure sensor are provided on a flow path, the program causing a computer to function as:
an actual flow rate calculation unit configured to calculate a flow rate based on measured pressures of the upstream pressure sensor and the downstream pressure sensor; and
a flow rate output unit configured to output a calculated flow rate calculated by the actual flow rate calculation unit,
wherein the flow rate output unit exerts a negative burst cutting function that is a function of outputting a zero value regardless of the calculated flow rate when the fluid control valve is in an open state and the flow rate calculated by the actual flow rate calculation unit is a negative flow rate.

6. A fluid control method using a fluid control device in which a fluid control valve, an upstream pressure sensor, and a downstream pressure sensor are provided on a flow path, the method comprising the steps of:
calculating a flow rate based on measured pressures of the upstream pressure sensor and the downstream pressure sensor; and
outputting a calculated flow rate calculated by the actual flow rate calculation unit,
wherein in the outputting of the calculated flow rate, when the fluid control valve is in an open state and the flow rate calculated by the actual flow rate calculation unit is a negative flow rate, a negative burst cutting function that is a function of outputting a zero value regardless of the calculated flow rate is exhibited.

* * * * *